United States Patent
Baessler et al.

[11] Patent Number: 6,149,223
[45] Date of Patent: *Nov. 21, 2000

[54] LOWERABLE REAR WINDOW FOR A FOLDING ROOF

[75] Inventors: Thomas Baessler, Holzergerlingen; Thomas Graf, Sindelfingen; Siegfried Zipperle, Aidlingen, all of Germany

[73] Assignee: DaimlerChrysler AG, Stuttgart, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/109,938

[22] Filed: Jul. 2, 1998

[30] Foreign Application Priority Data

Jul. 2, 1997 [DE] Germany .............. 197 28 081

[51] Int. Cl.⁷ .................................. B60J 1/18
[52] U.S. Cl. .............. 296/146.14; 296/108; 296/107.07
[58] Field of Search .................... 296/146.14, 108, 296/107.07, 145, 147, 202; 280/854

[56] References Cited

U.S. PATENT DOCUMENTS

| | | | |
|---|---|---|---|
| 2,007,873 | 7/1935 | Paulin | 296/108 |
| 2,704,225 | 3/1955 | Anschuetz et al. | 296/108 |
| 2,747,923 | 5/1956 | McLean | 296/107.07 |
| 2,768,024 | 10/1956 | Spear | 296/107.07 |
| 2,785,922 | 3/1957 | Chika | 296/107.07 |
| 2,836,457 | 5/1958 | Berman | 296/107.07 |
| 3,236,557 | 2/1966 | Podolan | 296/107.07 |
| 3,332,169 | 7/1967 | Lohr et al. | |
| 3,333,362 | 8/1967 | Kostin et al. | |
| 3,536,354 | 10/1970 | Ingram | 296/107.07 |
| 4,416,461 | 11/1983 | Hayashi et al. | 280/834 |
| 4,626,020 | 12/1986 | Kaltz et al. | 296/107.07 |
| 5,015,028 | 5/1991 | Bonnett | 296/107.07 |
| 5,050,663 | 9/1991 | Rhoads et al. | 296/107.07 |
| 5,195,780 | 3/1993 | Inoue et al. | 280/834 |
| 5,195,798 | 3/1993 | Klein et al. | 296/146.14 |
| 5,201,547 | 4/1993 | Ogava et al. | 280/834 |
| 5,429,409 | 7/1995 | Corder et al. | 296/108 |
| 5,520,432 | 5/1996 | Gmeiner et al. | 296/108 |
| 5,584,522 | 12/1996 | Kerner et al. | 296/108 |
| 5,743,587 | 4/1998 | Alexander et al. | 296/108 |
| 5,746,470 | 5/1998 | Seel et al. | 296/108 |
| 5,794,979 | 8/1998 | Kasuga et al. | 280/834 |

FOREIGN PATENT DOCUMENTS

| | | | |
|---|---|---|---|
| 0482681A1 | 4/1992 | European Pat. Off. | |
| 0482681B1 | 4/1992 | European Pat. Off. | |
| 2695080 | 3/1994 | France | 296/108 |
| 2695081 | 3/1994 | France | 296/108 |
| 3444593A1 | 6/1986 | Germany. | |
| 3607650A1 | 9/1987 | Germany. | |
| 3635375 | 4/1988 | Germany | 296/108 |
| 3635887A1 | 5/1988 | Germany. | |
| 3635887C2 | 9/1990 | Germany. | |
| 4320492A1 | 10/1994 | Germany. | |
| 4316485 | 11/1994 | Germany | 296/108 |
| 0005237 | 1/1991 | Japan | 296/108 |
| 2167715A | 6/1986 | United Kingdom. | |
| 2187143A | 9/1987 | United Kingdom. | |

OTHER PUBLICATIONS

Search Report, filed Sep. 23, 1998, Great Britain.
Patent Abstracts of Japan, Jul. 12, 1989, application 62–329550, M–878 Oct. 9, 1989, vol. 13, No. 449, Opening/Closing Device for Rear Window of Automobile.

*Primary Examiner*—Joseph D. Pape
*Assistant Examiner*—Kiran Patel
*Attorney, Agent, or Firm*—Evenson, McKeown, Edwards & Lenahan, P.L.L.C.

[57] ABSTRACT

A lowerable rear window that can be convex or bent for a folding roof of a vehicle that has lateral C-pillars is provided for a passenger vehicle. The rear window is designed as a separate part and is locked in the closed state to the folding roof. The rear window has control levers on each side. The rear window is separated from the C-pillars and the folding roof by the rotary movement of the control levers and can be stowed behind a tank of the vehicle.

12 Claims, 3 Drawing Sheets

LOWERABLE REAR WINDOW FOR A FOLDING ROOF

BACKGROUND AND SUMMARY OF THE INVENTION

This application claims the priority of German application 197 28 081.1-21, filed in Germany on Jul. 2, 1997, the disclosure of which is expressly incorporated by reference herein.

The invention relates to a lowerable rear window that runs convexly or bent, for a folding roof of a motor vehicle that has lateral C-pillars.

A lowerable rear window for a motor vehicle is known from German Patent Document DE 34 44 593 A1, said window being stowable in a vertical stowed position inside the vehicle. The disadvantage of this arrangement is that this takes up a corresponding useful space inside the vehicle. It is also disadvantageous that this stowage method makes sense only for essentially flat panes.

German Patent Document DE 36 07 650 A1 teaches a device for pulling in the rear window of a motor vehicle and likewise stowing it essentially vertically inside the vehicle. The device therefore has the same disadvantages as the one described above.

A folding roof for a vehicle is known from European Patent Document EP 0 482 681 B1, said roof consisting of a forward roof part and a rear roof part with a rear window. Both parts are stowed ahead of the rear axle in the front area of the vehicle so that they require a corresponding amount of stowage space.

A goal of the present invention is to provide stowage capability for a convex or bent rear window in a folding roof, so that as little useful stowage space as possible is lost when the rear window is stowed.

According to the invention, this goal is achieved by providing a lowerable rear window that can be convex or bent, for a folding roof of a vehicle that has lateral C-pillars with the following features: wherein the rear window is designed as a separate part and is locked in a closed state to the folding roof; wherein the rear window has control levers on each side; and wherein the rear window is separated by a rotary movement of the control levers from the C-pillars and the folding roof and can be stowed above and behind a tank of the vehicle.

According to the invention, the rear window is designed as a separate part. In particular, it is no longer connected to the lateral C-pillars. Consequently, it can be stowed separately from the other parts. As a result, the C-pillars also can be accommodated very compactly in the trunk area of the vehicle, since a cross connection between the two C-pillars is no longer required or because they can be eliminated by the separate stowage of the rear window. The folding roof itself can likewise be stowed in a compact fashion in the trunk area.

The fact that the rear window is stowed above and below the tank, which accordingly can have its shape adapted to the shape of the rear window, the stowed rear window takes up almost no stowage space in the vehicle. The tank volume can remain essentially constant as a result.

Another advantage of the separation of the rear window from the folding roof according to the invention is the possibility of driving with the rear window lowered and with the folding roof otherwise closed. In this manner, a so-called landaulet position is achieved.

In a highly advantageous embodiment of the invention, two control levers can be provided on each side to form a parallelogram.

As a result of this design, with the control levers in a position in which they are tilted forward and upward, there is a short lifting movement of the rear window at the beginning of the turning and lowering motion. If the rear window is provided with a rain gutter that is located in a rain gutter of the C-pillars, the rain gutter of the rear window will be lifted out of the rain gutter of the C-pillars before the downward rotary movement takes place. In this manner, the separate process of stowing the rear window is not impeded by the rain gutters.

Other objects, advantages and novel features of the present invention will become apparent from the following detailed description of the invention when considered in conjunction with the accompanying drawings.

DETAILED DESCRIPTION OF THE DRAWINGS

Since the design and manner of stowage of a folding roof are basically known and have nothing to do directly with the present invention itself, only those parts that are essential to the invention for separate stowage of a bent rear window 1 with its two pane parts 1a and 1b or curved window 1c will be described in greater detail.

Figure 1:
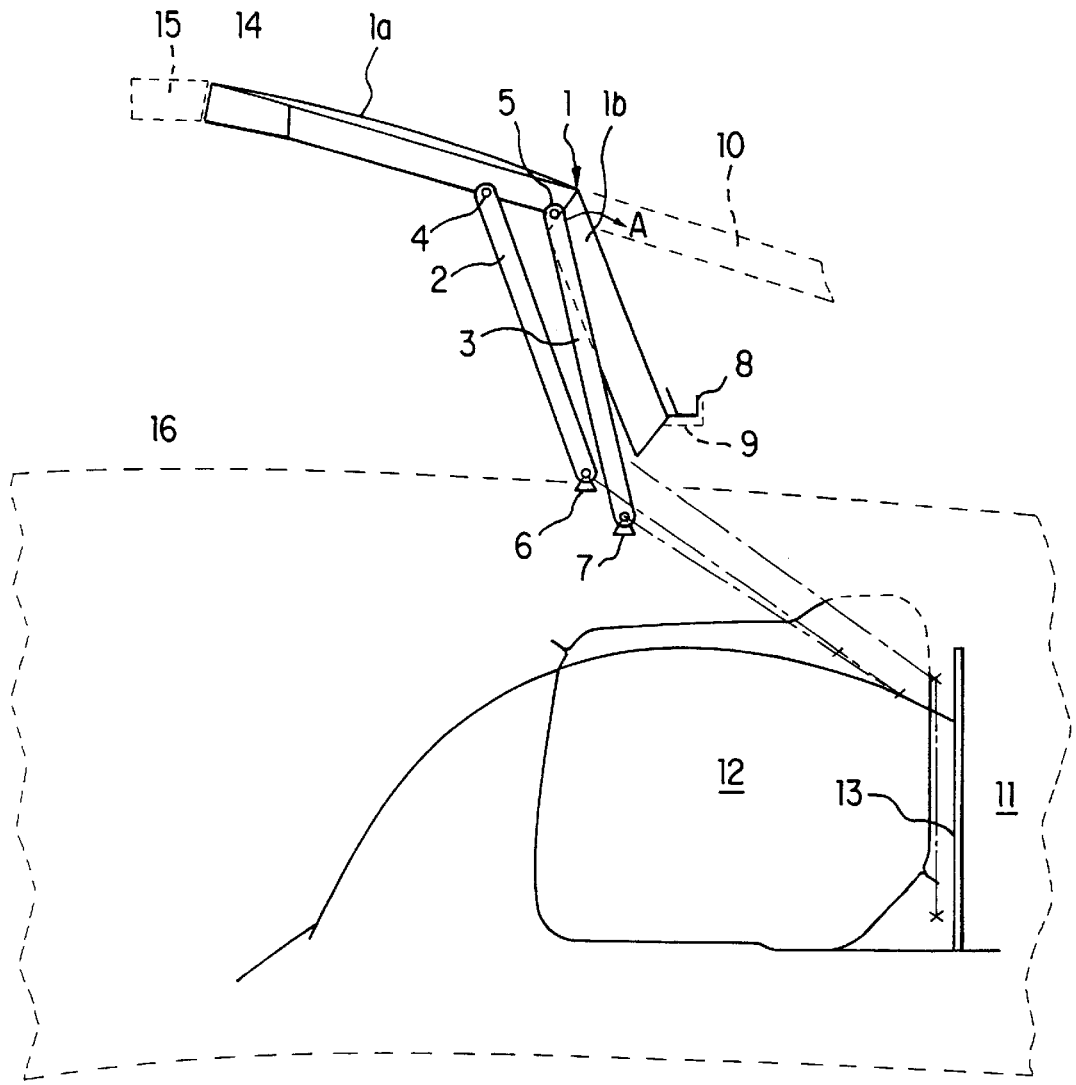
FIG. 1 is a schematic side view of a folding roof assembly, constructed in accordance with a preferred embodiment of the present invention.

A rear window support assembly including two control levers 2 and 3 are articulated to the rear window 1 at articulation points 4 and 5 is schematically depicted in FIG. 1. The two control levers 2 and 3 are connected with the vehicle with articulation at articulation points 6 and 7. The two control levers 2 and 3 thus form a parallelogram on each side of the vehicle. The drawing FIG. 1 illustrates the levers 2 and 3 at one side of the vehicle, it being understood that a similar set of control levers is provided at the opposite side of the vehicle.

Figure 2:
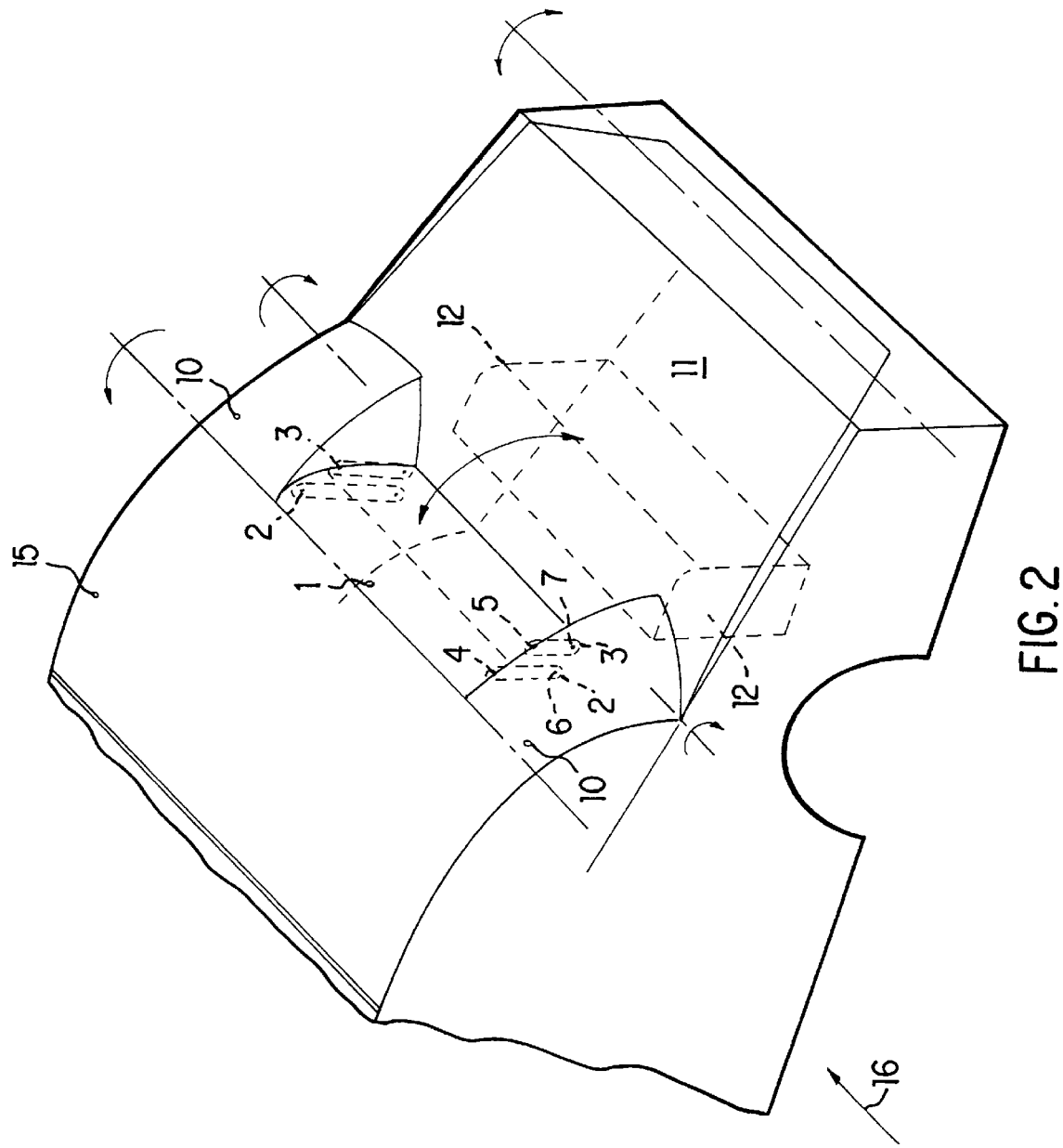
FIG. 2 is a perspective schematic view depicting the folding roof assembly of FIG. 1 in a vehicle, shown in a window closed position.
Figure 3:
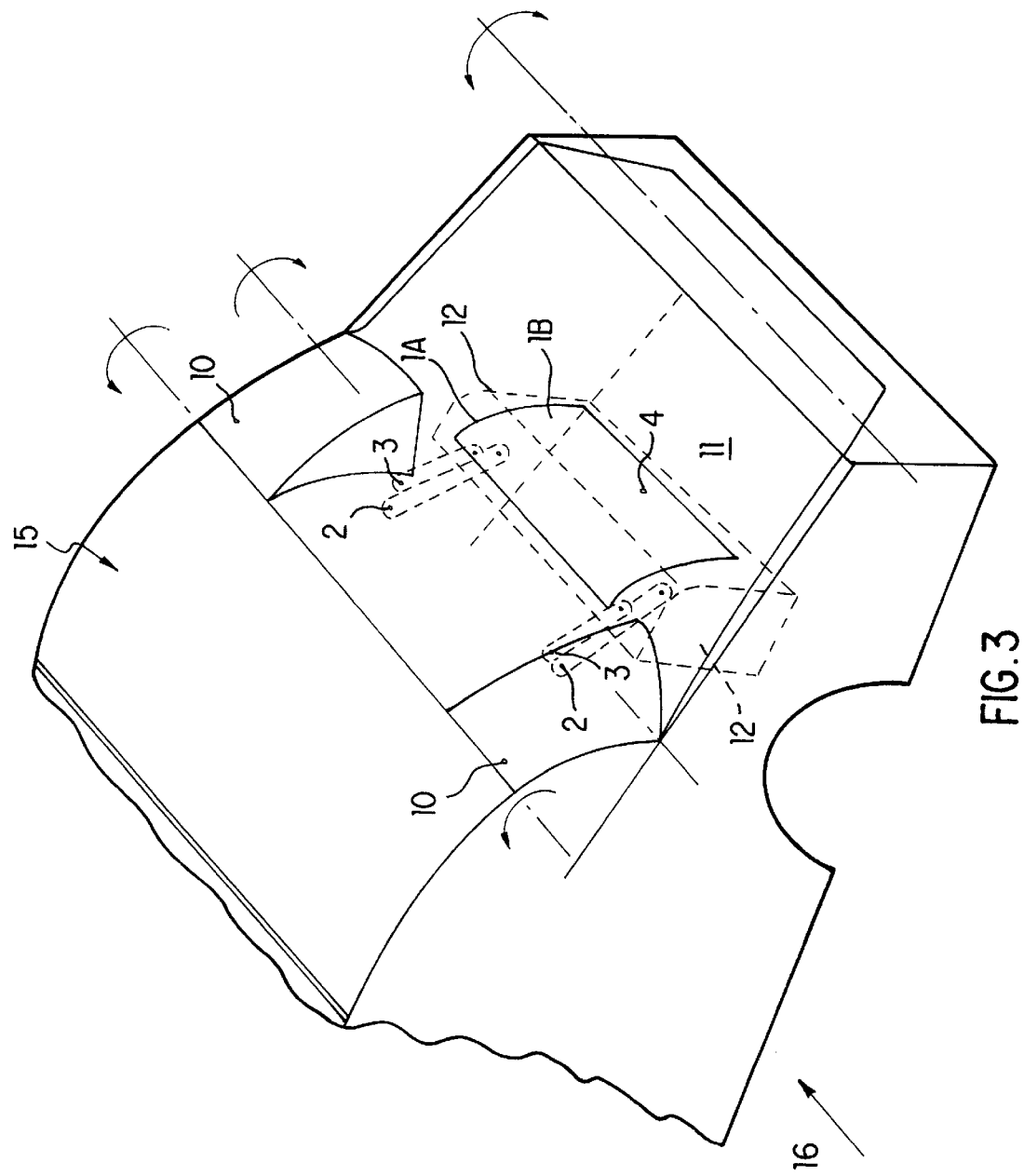
FIG. 3 is a view similar to FIG. 2, showing the window in an open, stowed position.

FIGS. 2 and 3 are perspective views depicting the vehicle 16 with the window 1 and levers 2 and 3 in respective closed (FIG. 2) and open stowed (FIG. 3) positions.

At the lower end, rear window 1 and/or pane part 1b is provided with a rain gutter 8 running transversely. Rain gutter 8 lies in a rain gutter 9, represented by the dashed lines, of a C-pillar 10 that is likewise shown only by dashed lines. Rain gutter 9 connects the two lateral C-pillars at the lower end, but does not constitute a disturbing factor when the two C-pillars are stowed laterally in a trunk 11. A tank partition 13 is located between trunk 11 and a tank 12.

Rear window 1 with the two rear window parts 1a and 1b is stowed as follows:

From the closed position shown in FIG. 1, after a rear lid, not shown, of trunk 11 is opened, the rear window is unlocked at a locking point 14, not shown in greater detail, from a folding roof 15. Then the two control levers 2 and 3 are turned in the direction of arrow A, with a slight lifting taking place at the beginning of the rotary movement, so that rain gutter 8 of rear window 1 is separated from rain gutter 9 of the C-pillars. This is controlled by the positioning of the two control levers 2 and 3. As can be seen from the drawings, the two upper articulation points 4 and 5 are each located further forward in the direction of travel than the respective associated lower articulation points 6 and 7 of front control levers 2 and 3. As a result of the resultant kinematics, the desired slight lifting of rear window 7 is performed before the rotary movement rearward and downward.

As can be seen from FIG. 2, and the dashed lines in FIG. 1, rear window part 1b slides into a space between tank partition 13 and tank 12 while rear window part 1a comes to rest above tank 12. As can also be seen from the drawing, no special stowage space is therefore required for stowing rear window 1. Only the part of a conventional tank 12 outlined by the dashed lines in FIG. 1 must be eliminated in this case. If it is important to have an unchanged tank volume, however, this missing part can be compensated without any problem in the forward area of the tank by increasing its size accordingly.

If only rear window 1 is stowed as described above and folding roof 15 with C-pillars 10 is left in the closed position, the result is a landaulet position. The opening and closing of folding roof 15 and the C-pillars can proceed in known fashion. The two C-pillars 10 can be stowed compactly laterally in trunk 11. The remaining roof parts can also be stowed relatively compactly in trunk 11 since, in contrast to the prior art, there is no longer a stowed rear window 1 beneath a stowed folding roof 15, in which case, because parts of folding roof 15 and rear window 1 are curved toward one another, a considerable amount of stowage space in the trunk is lost.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Passenger vehicle assembly comprising:
   a trunk compartment,
   a fuel tank disposed in front of the trunk compartment and spaced therefrom,
   a nonplanar rear window, and
   a rear window support assembly accommodating movement of the rear window between a vehicle closed position and a stowage position with said rear window extending above and behind the fuel tank, wherein
       said rear window support assembly includes a pair of control levers at each side of the rear window, said control levers forming a parallelogram support for the rear window with guided predetermined movement of the rear window from the vehicle closed position to the stowage position.

2. Passenger vehicle assembly according to claim 1, wherein said rear window is a curved window.

3. Passenger vehicle assembly according to claim 1, wherein said rear window includes a forward section joined by a rearwardly downwardly sloping rear section, and
   wherein, in the stowage position, said rear section is disposed between the fuel tank and the trunk space and the forward section extends above the tank.

4. Passenger vehicle assembly according to claim 1, wherein the rear window is part of a foldable vehicle roof.

5. Passenger vehicle assembly according to claim 2, wherein the rear window is part of a foldable vehicle roof.

6. Passenger vehicle assembly according to claim 3, wherein the rear window is part of a foldable vehicle roof.

7. A lowerable rear window assembly which in use is disposed on a vehicle having a trunk compartment and a fuel tank disposed in front of the trunk compartment and spaced therefrom, said rear window assembly comprising:
   a rear window, and
   a rear window support assembly accommodating movement of the rear window between a vehicle window opening in closed position and a vehicle window opening opened position, said window being disposable in a stowage position when opened in a position extending behind the fuel tank, wherein
       said rear window support assembly includes a pair of control levers at each side of the rear window, said control levers forming a parallelogram support for the rear window with guided predetermined movement of the rear window from the vehicle closed position to the stowage position.

8. Lowerable rear window assembly according to claim 7, wherein said rear window is a curved window.

9. Lowerable rear window assembly according to claim 7, wherein said rear window includes a forward section joined by a rearwardly downwardly sloping rear section, and
   wherein, in the stowage position, said rear section is disposed between the fuel tank and the trunk space and the forward section extends above the tank.

10. Lowerable rear window assembly according to claim 7, wherein the rear window is part of a foldable vehicle roof.

11. Lowerable rear window assembly according to claim 8, wherein the rear window is part of a foldable vehicle roof.

12. Lowerable rear window assembly according to claim 9, wherein the rear window is part of a foldable vehicle roof.

* * * * *